US009637558B2

(12) United States Patent
Yao

(10) Patent No.: US 9,637,558 B2
(45) Date of Patent: May 2, 2017

(54) RESIN COMPOSITION AND RESIN MOLDED ARTICLE

(71) Applicant: FUJI XEROX CO., LTD., Tokyo (JP)

(72) Inventor: Kenji Yao, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/837,645

(22) Filed: Aug. 27, 2015

(65) Prior Publication Data

US 2016/0280802 A1 Sep. 29, 2016

(30) Foreign Application Priority Data

Mar. 26, 2015 (JP) ................................. 2015-064762

(51) Int. Cl.
*C08L 1/00* (2006.01)
*C08B 3/06* (2006.01)

(52) U.S. Cl.
CPC ..................................... *C08B 3/06* (2013.01)

(58) Field of Classification Search
CPC ................. C08K 5/11; C08L 1/00; C08L 1/02
See application file for complete search history.

(56) References Cited

U.S. PATENT DOCUMENTS

| 5,919,920 A | 7/1999 | Murakami et al. |
| 5,962,677 A | 10/1999 | Murakami et al. |
| 2008/0246189 A1* | 10/2008 | Kuzuhara ............... B29C 41/28 264/334 |
| 2011/0081495 A1 | 4/2011 | Hayashi et al. |
| 2012/0142910 A1 | 6/2012 | Buchanan et al. |
| 2012/0165517 A1 | 6/2012 | Uehira et al. |
| 2015/0259507 A1 | 9/2015 | Imanishi et al. |

FOREIGN PATENT DOCUMENTS

| JP | H08-337601 A | 12/1996 |
| JP | 2002-146045 A | 5/2002 |
| JP | 2002-363342 A | 12/2002 |
| JP | 2005-194302 A | 7/2005 |
| JP | 2006-176610 A | 7/2006 |
| JP | 2006-299012 A | 11/2006 |
| JP | 2007-051304 A | 3/2007 |
| JP | 2007-260990 A | 10/2007 |
| JP | 2008-156416 A | 7/2008 |
| JP | 2011-057959 A | 3/2011 |
| JP | 2011-068767 A | 4/2011 |
| JP | 2011-083955 A | 4/2011 |
| JP | 2013-066816 A | 4/2013 |
| JP | 2014-012852 A | 1/2014 |
| JP | 2014-028935 A | 2/2014 |
| JP | 2014-084343 A | 5/2014 |
| WO | 2009/151018 A1 | 12/2009 |
| WO | 2014/061644 A1 | 4/2014 |

OTHER PUBLICATIONS

Jun. 15, 2016 Office Action issued in U.S. Appl. No. 14/824,331.
Jun. 15, 2016 Office Action issued in U.S. Appl. No. 14/829,100.
Jun. 13, 2016 Office Action issued in U.S. Appl. No. 14/822,087.
U.S. Appl. No. 14/829,100, filed Aug. 18, 2015 in the name of Yao et al.
U.S. Appl. No. 14/822,087, filed Aug. 10, 2015 in the name of Yoshizawa et al.
U.S. Appl. No. 14/824,331, filed Aug. 12, 2015 in the name of Moriyama et al.
Sep. 20, 2016 Office Action issued in Japanese Patent Application No. 2015-064719.
Sep. 20, 2016 Office Action issued in Japanese Patent Application No. 2015-064762.
Oct. 4, 2016 Office Action issued in Japanese Patent Application No. 2015-064766.
Oct. 4, 2016 Office Action issued in Japanese Patent Application No. 2015-064765.
Dec. 13, 2016 Office Action issued in Japanese Patent Application No. 2015-064762.
Dec. 29, 2016 Office Action issued in U.S. Appl. No. 14/824,331.
Dec. 29, 2016 Office Action issued in U.S. Appl. No. 14/822,087.
Jan. 10, 2017 Office Action issued in Japanese Patent Application No. 2015-064765.
Jan. 10, 2017 Office Action issued in Japanese Patent Application No. 2015-064766.

\* cited by examiner

*Primary Examiner* — Kaj K Olsen
*Assistant Examiner* — Alexander Polyansky

(57) ABSTRACT

A resin composition includes a cellulose derivative in which at least one hydroxyl group is substituted with an acetyl group in an amount ratio of 90% by weight or greater with respect to a total amount of the resin composition, wherein a melt flow rate (MFR) of the resin composition is in a range of 10 g/10 min to 20 g/10 min.

15 Claims, No Drawings

RESIN COMPOSITION AND RESIN MOLDED ARTICLE

CROSS-REFERENCE TO RELATED APPLICATIONS

This application is based on and claims priority under 35 USC 119 from Japanese Patent Application No. 2015-064762 filed Mar. 26, 2015.

BACKGROUND

1. Technical Field

The invention relates to a resin composition and a resin molded article.

2. Related Art

In the past, various resin compositions are provided to be used for various applications. For example, thermoplastic resins are used in various components and housings of home appliances or automobiles, or in components such as housings of business machines and electric and electronic apparatuses.

Recently, resins derived from plants are used, and a cellulose derivative is one of the resins derived from plants which are well-known from the past.

SUMMARY

According to an aspect of the invention, there is provided a resin composition including:

a cellulose derivative in which at least one hydroxyl group is substituted with an acetyl group in an amount ratio of 90% by weight or greater with respect to a total amount of the resin composition, wherein a melt flow rate (MFR) of the resin composition is in a range of 10 g/10 min to 20 g/10 min.

DETAILED DESCRIPTION

Hereinafter, exemplary embodiments which are examples of the invention are described. These description and examples exemplify the invention, and do not intend to limit the scope of the invention.

With respect to the amount of each component to be contained in a composition as described in the specification, if plural kinds of materials exist as a certain component in the composition, the amount mean a total amount of the plural kinds of materials existing in the composition, unless described otherwise.

Resin Composition

The resin composition according to the exemplary embodiment contains 90% by weight or greater of a cellulose derivative (hereinafter, referred to as "acetyl cellulose derivative") in which at least one hydroxyl group is substituted with an acetyl group with respect to a total amount of the resin composition. Also, the melt flow rate (MFR) of the resin composition is in the range of 10 g/10 min to 20 g/10 min.

As examples of the cellulose derivative, a cellulose derivative having a hydrocarbon group, a group including an acyl group and an alkylene oxy group, and an acyl group is known. In the cellulose derivative having such substituents, thermal fluidity is increased by decreasing a melting point.

Meanwhile, a cellulose derivative in which at least one hydrogen group is substituted with a substituent (for example, propylene oxide, and propionyl group) in which steric hindrance is great has improved thermal fluidity, but a water absorption warp may be formed in a resin molded article to be obtained from the cellulose derivative.

It is considered that the reason is that solidification speed of the resin composition containing the cellulose derivative is slow, time is required for the solidification, solidification speed difference between a contact portion with a mold for molding and an inner side portion becomes great, and thus residual stress is generated in the resin molded article to be obtained. In addition, it is also considered that the reason is that the strength of the resin molded article to be obtained tends to be decreased due to the steric hindrance of the substituent in the cellulose derivative.

On the contrary, with respect to the resin composition according to the exemplary embodiment, if a melt flow rate (MFR) of the resin composition including the acetyl cellulose derivative is set to be in the range of 10 g/10 min to 20 g/10 min, a resin molded article in which a water absorption warp is prevented may be obtained.

The reason is not clear, but it is assumed as follows.

The acetyl cellulose derivative has an acetyl group having small steric hindrance, and thus has a fast solidification speed compared with a case in which a substituent (for example, propylene oxy and propionyl group) having great steric hindrance is included. The melt flow rate (MFR) of the resin composition including 90% by weight or greater of the acetyl cellulose derivative having this characteristic is increased to the scope described above, the resin composition at the time of molding flows fast into the mold for molding, and thus the resin molded article to be obtained is easily filled with the acetyl cellulose derivative. In addition, solidification time is short, and the solidification speed difference between the contact portion with the mold for molding and the inner side portion becomes small. Accordingly, it is difficult that the residual stress is generated in the resin molded article to be obtained.

Further, the resin molded article to be obtained is easily filled with the acetyl cellulose derivative, and also since the steric hindrance of the acetyl cellulose derivative is small, the strength of the resin molded article to be obtained is increased.

From the above, it is assumed that a resin molded article in which the water absorption warp is prevented may be obtained from the resin composition according to the exemplary embodiment.

In addition, the resin composition according to the exemplary embodiment has short solidification time, and thus a molding cycle becomes short.

The resin composition according to the exemplary embodiment has small solidification speed difference between a contact portion with a mold for molding and an inner side portion, and has increased strength of the resin molded article to be obtained, and thus the formation of a sink mark (recessed mark formed on surface of resin molded article) is also prevented.

Melt Flow Rate

The melt flow rate (MFR) of the resin composition according to the exemplary embodiment is in the range of 10 g/10 min to 20 g/10 min. However, in view of preventing the water absorption warp of the resin molded article to be obtained, the melt flow rate (MFR) is preferably in the range of 12 g/10 min to 18 g/10 min, and more preferably in the range of 14 g/10 min to 16 g/10 min.

The melt flow rate (MFR) of the resin composition is a value measured in the conditions of a resin temperature of 220° C., and a load of 10 kg by using a melt indexer (MI manufactured by Toyo Seiki Seisaku-sho, Ltd.).

Hereinafter, components constituting the resin composition according to the exemplary embodiment are described in detail.

Acetyl Cellulose Derivative

The acetyl cellulose derivative is described.

The acetyl cellulose derivative is the cellulose derivative in which at least one hydroxyl group is substituted with an acetyl group. Specifically, the acetyl cellulose derivative is preferably a compound represented by The formula (1).

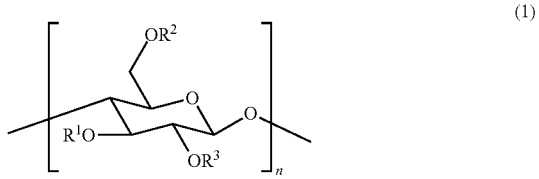

(1)

In the formula (1), $R^1$, $R^2$, and $R^3$ each independently represent a hydrogen atom or an acyl group. n represents an integer of 2 or greater. However, at least one of plural $R^1$s, plural $R^2$s and plural $R^3$s represents an acyl group.

In the formula (1), a range of n is not particularly limited, but may be determined according to the preferable scope of the weight average molecular weight described above. Specifically, n is preferably in the range of 40 to 300, and more preferably in the range of 100 to 200.

If n is 40 or greater, the strength of the resin molded article is easily increased. If n is 300 or lower, the decrease of flexibility of the resin molded article is easily prevented.

Weight Average Molecular Weight

The weight average molecular weight of the acetyl cellulose derivative is preferably 10,000 or greater and less than 75,000, and more preferably in the range of 20,000 to 50,000.

If the weight average molecular weight is in the range of 10,000 or greater and less than 75,000, the melt flow rate (MFR) of the resin composition including the acetyl cellulose derivative is adjusted to the range described above, and thus the formation of the water absorption warp of the resin molded article to be obtained is easily prevented. In addition, if the weight average molecular weight is in the range of 10,000 or greater and less than 75,000, it is difficult that the molecular chains of the acetyl cellulose derivative are oriented and become irregular, and the strength of the resin molded article to be obtained becomes high, and the formation of the water absorption warp is easily prevented.

Here, the weight average molecular weight (Mw) is a value measured by gel permeation chromatography (GPC). Specifically, the molecular weight measurement by GPC is performed with a GPC apparatus (manufactured by Tosoh corporation, HLC-8320GPC, Column: TSKgel α-M) by using a solution of dimethylacetamide/lithium chloride having a volume ratio of 90/10.

Substitution Degree

In view of increasing thermal fluidity, the substitution degree of the acetyl cellulose derivative is preferably in the range of 1.8 to 2.5, more preferably in the range of 2.0 to 2.5, and still more preferably in the range of 2.2 to 2.5.

In addition, the substitution degree is an index indicating the degree to which the hydroxyl group included in acetyl cellulose is substituted with the substituent. That is, the substitution degree is an index indicating a degree of acetylation of an acetyl cellulose derivative. Specifically, the substitution degree means an intramolecular average of the number of substitutions with an acetyl group with respect to three hydroxyl groups included in a D-glucopyranose unit of the acetyl cellulose derivative.

Preparation Method

A method of preparing the acetyl cellulose derivative is not particularly limited, and a well-known method may be employed.

Hereinafter, the method of preparing the acetyl cellulose derivative (hereinafter, referred to as "specific acetyl cellulose derivative") in which the weight average molecular weight is 10,000 or greater and less than 75,000 is described with reference to examples.

Adjustment of Molecular Weight of Cellulose

First, cellulose before acylation, that is, cellulose of which a hydroxyl group is not substituted with an acyl group, is prepared and the molecular weight thereof is adjusted.

As the cellulose before acylation, cellulose prepared arbitrarily may be used or commercially available cellulose may be used. Incidentally, the cellulose is usually a resin derived from plants, and the weight average molecular weight thereof is generally higher than that of the specific cellulose derivative according to the exemplary embodiment. Therefore, the adjustment of the molecular weight of the cellulose generally includes a step for decreasing the molecular weight.

For example, the weight average molecular weight of the commercially available cellulose is generally in the range of 150,000 to 500,000.

As the commercially available cellulose before acylation, for example, KC Flock (W50, W100, W200, W300G, W400G, W-100F, W60MG, W-50GK, and W-100GK), NDPT, NDPS, LNDP, and NSPP-HR manufactured by Nippon Paper Industries Co., Ltd. are included.

A method of adjusting a molecular weight of the cellulose before acylation is not particularly limited, but for example, there is a method of decreasing the molecular weight by stirring the cellulose in liquid.

By adjusting the speed and the time for the stirring of the cellulose is stirred, the molecular weight of the cellulose may be adjusted to a required value. In addition, though not particularly limited, the stirring speed when the cellulose is stirred is preferably in the range of 50 rpm to 3,000 rpm, and more preferably in the range of 100 rpm to 1,000 rpm. In addition, the stirring time is preferably in the range of 2 hours to 48 hours, and more preferably in the range of 5 hours to 24 hours.

In addition, as the liquid used when the cellulose is stirred, an aqueous solution of hydrochloric acid, an aqueous solution of formic acid, an aqueous solution of acetic acid, an aqueous solution of nitric acid, and an aqueous solution of sulfuric acid are exemplified.

Preparation of Acetyl Cellulose Derivative

The cellulose in which a molecular amount is adjusted by the method described above or the like is acetylated with an acetyl group by a well-known method, so as to obtain a specific acetyl cellulose derivative.

Specifically, the specific acetyl cellulose derivative may be obtained, for example, by a method of esterifying the cellulose by using a mixture of acetic acid, acetic anhydride, and sulfuric acid, or the like.

After acetylation, in order to adjust the substitution degree, a deacetylation step may be further provided. In addition, a refining step may be further provided after the acetylation step or the deacetylation step.

Ratio Occupied in Resin Composition

In the resin composition according to the exemplary embodiment, a ratio occupied by the acetyl cellulose derivative with respect to the total amount of the resin composition is preferably 90% by weight or greater, more preferably 95% by weight or greater, and may be 100% by weight. If the ratio is 90% by weight or greater, a resin molded article in which the formation of a water absorption warp is prevented may be easily obtained.

Plasticizer

The resin composition according to the exemplary embodiment may further contain a plasticizer.

In addition, the content of the plasticizer is such an amount that the ratio of the cellulose derivative occupied in the total amount of the resin composition becomes the range described above. More specifically, the ratio of the plasticizer with respect to the total amount of the resin composition is preferably 10% by weight or lower, more preferably 5% by weight or lower. If the ratio of the plasticizer is in the range described above, an elastic modulus becomes higher, and thus heat resistance becomes higher as well. In addition, bleeding of the plasticizer is prevented.

For example, as the plasticizer, an adipic acid ester-containing compound, a polyether ester compound, a sebacic acid ester compound, a glycol ester compound, an acetic acid ester, a dibasic acid ester compound, a phosphoric acid ester compound, a phthalic acid ester compound, camphor, citric acid ester, stearic acid ester, metallic soap, polyol, polyalkylene oxide, and the like are exemplified.

Among these, an adipic acid ester-containing compound, and a polyether ester compound are preferable, and an adipic acid ester-containing compound is more preferable.

Adipic Acid Ester-Containing Compound

An adipic acid ester-containing compound (compound containing adipic acid ester) refers to a compound of individual adipic acid esters, and a mixture of adipic acid ester and components other than adipic acid ester (compound different from adipic acid ester). However, the adipic acid ester-containing compound may preferably contain the adipic acid ester by 50% by weight or more with respect to the total of adipic acid ester and other components.

As the adipic acid ester, for example, an adipic acid diester, and an adipic acid polyester are exemplified. Specifically, an adipic acid diester represented by the formula (2-1) and an adipic acid polyester represented by the formula (2-2) are exemplified.

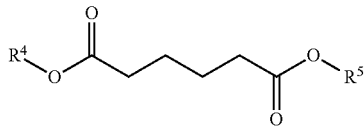

(2-1)

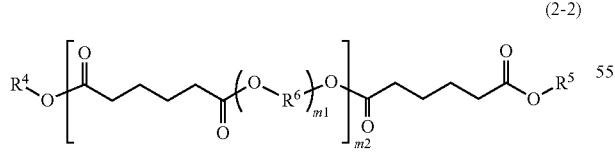

(2-2)

In the formulae (2-1) and (2-2), $R^4$ and $R^5$ each independently represents an alkyl group, or a polyoxyalkyl group $[—(C_xH_{2x}—O)_y—R^{41}]$ (provided that $R^{41}$ represents an alkyl group, x represents an integer in the range of 1 to 10, and y represents an integer in the range of 1 to 10.).

$R^6$ represents an alkylene group.

m1 represents an integer in the range of 1 to 20.

m2 represents an integer in the range of 1 to 10.

In the formulae (2-1) and (2-2), the alkyl groups represented by $R^4$ and $R^5$ are preferably alkyl groups having 1 to 6 carbon atoms, and more preferably alkyl groups having 1 to 4 carbon atoms. The alkyl groups represented by $R^4$ and $R^5$ may have any one of a linear shape, a branched shape, or a cyclic shape, but preferably a linear shape and a branched shape.

In the formulae (2-1) and (2-2), in the polyoxyalkyl group represented by $R^4$ and $R^5$ $[—(C_xH_{2x}—O)_y—R^{41}]$, the alkyl group represented by $R^{41}$ is preferably an alkyl group having 1 to 6 carbon atoms, and more preferably an alkyl group having 1 to 4 carbon atoms. The alkyl group represented by $R^{41}$ may have any one of a linear shape, a branched shape, or a cyclic shape, but preferably a linear shape and a branched shape.

In the formula (2-2), the alkylene group represented by $R^6$ is preferably an alkylene group having 1 to 6 carbon atoms, and more preferably an alkylene group having 1 to 4 carbon atoms. The alkylene group represented by $R^6$ may have any one of a linear shape, a branched shape, or a cyclic shape, but preferably a linear shape and a branched shape.

In the formulae (2-1) and (2-2), the group represented by each of symbols $R^4$ to $R^6$ may be substituted with a substituent. As the substituent, an alkyl group, an aryl group, and a hydroxyl group are exemplified.

The molecular weight of the adipic acid ester (or weight average molecular weight) is preferably in the range of 200 to 5,000, and more preferably in the range of 300 to 2,000. The weight average molecular weight is a value measured according to the method of measuring the weight average molecular weight of the cellulose derivative described above.

Specific examples of the adipic acid ester-containing compound are described below, but the invention is not limited thereto.

|  | Name of Material | Name of Product | Manufacturer |
| --- | --- | --- | --- |
| ADP1 | Adipic acid diester | Daifatty 101 | Daihachi Chemical Industry Co., Ltd. |
| ADP2 | Adipic acid diester | Adeka Cizer RS-107 | ADEKA Corporation |
| ADP3 | Adipic acid polyester | Polycizer W-230-H | DIC Corporation |

Polyether Ester Compound

As the polyether ester compound, for example, a polyether ester compound represented by the formula (2) is exemplified.

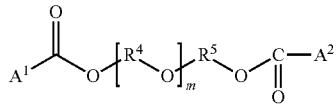

(2)

In the formula (2), $R^4$ and $R^5$ each independently represents an alkylene group having 2 to 10 carbon atoms. $A^1$ and $A^2$ each independently represents an alkyl group having 1 to 6 carbon atoms, an aryl group having 6 to 12 carbon atoms, or an aralkyl group having 7 to 18 carbon atoms. m represents an integer of 1 or greater.

In the formula (2), as the alkylene group represented by $R^4$, an alkylene group having 3 to 10 carbon atoms is preferable, and an alkylene group having 3 to 6 carbon atoms is more preferable. The alkylene group represented by $R^4$ may have any one of a linear shape, a branched shape, or a cyclic shape, but preferably a linear shape.

If the number of carbons of the alkylene group represented by $R^4$ is set to be 3 or greater, the decrease of the fluidity of the resin composition is prevented, and thermoplasticity is easily exhibited. If the number of carbons of the alkylene group represented by $R^4$ is 10 or lower, or the alkylene group represented by $R^4$ has a linear shape, the affinity to the cellulose derivative is easily enhanced. Therefore, if the alkylene group represented by $R^4$ has a linear shape, and the number of carbons is in the range described above, moldability of the resin composition is enhanced.

In this point of view, particularly, the alkylene group represented by $R^4$ is preferably a n-hexylene group (—$(CH_2)_6$—). That is, the polyether ester compound is preferably a compound where $R^4$ represents a n-hexylene group (—$(CH_2)_6$—).

In the formula (2), as the alkylene group represented by $R^5$, an alkylene group having 3 to 10 carbon atoms is preferable, and an alkylene group having 3 to 6 carbon atoms is more preferable. The alkylene group represented by $R^5$ may have any one of a linear shape, a branched shape, or a cyclic shape, but preferably a linear shape.

If the number of carbons of the alkylene group represented by $R^5$ is 3 or greater, the decrease of the fluidity of the resin composition is prevented, and the thermoplasticity is easily exhibited. If the number of carbons of the alkylene group represented by $R^5$ is 10 or lower, or if the alkylene group represented by $R^5$ has a linear shape, the affinity to the cellulose derivative is easily enhanced. Therefore, if the alkylene group represented by $R^5$ has a linear shape, and the number of carbons is in the range described above, moldability of the resin composition is enhanced.

In this point of view, particularly, the alkylene group represented by $R^5$ is preferably a n-butylene group (—$(CH_2)_4$—). That is, the polyether ester compound is preferably a compound where $R^5$ represents a n-butylene group (—$(CH_2)_4$—).

In the formula (2), the alkyl groups represented by $A^1$ and $A^2$ are alkyl groups having 1 to 6 carbon atoms, and alkyl groups having 2 to 4 carbon atoms are more preferable. The alkyl groups represented by A and $A^2$ may have any one of a linear shape, a branched shape, or a cyclic shape, but preferably a branched shape.

The aryl groups represented by $A^1$ and $A^2$ are aryl groups having 6 to 12 carbon atoms, and as examples thereof, an unsubstituted aryl group such as a phenyl group and a naphthyl group or a substituted phenyl group such as a t-butylphenyl group and a hydroxyphenyl group are exemplified.

The aralkyl group represented by $A^1$ and $A^2$ is a group represented by —$R^A$-Ph. $R^A$ represents a linear-shaped or branched alkylene group having 1 to 6 carbon atoms (preferably, having 2 to 4 carbon atoms). Ph represents an unsubstituted phenyl group or a substituted phenyl group which is substituted with the linear-shaped or branched alkyl group having 1 to 6 carbon atoms (preferably, having 2 to 6 carbon atoms). As the aralkyl group, specifically, for example, an unsubstituted aralkyl group such as a benzil group, a phenylmethyl group (phenethyl group), a phenylpropyl group, and a phenylbutyl group, and a substituted aralkyl group such as a methylbenzil group, a dimethylbenzil group, and a methylphenethyl group are exemplified.

At least one of $A^1$ and $A^2$ preferably represents an aryl group or an aralkyl group. That is, the polyether ester compound is preferably a compound where at least one of $A^1$ and $A^2$ represents an aryl group (preferably, phenyl group) or an aralkyl group, and preferably a compound where both of $A^1$ and $A^2$ represent an aryl group (preferably, phenyl group) or an aralkyl group.

Subsequently, characteristics of the polyether ester compound are described.

The weight average molecular weight (Mw) of the polyether ester compound is preferably in the range of 450 to 650, and more preferably in the range of 500 to 600.

If the weight average molecular weight (Mw) is 450 or greater, bleeding (phenomenon of deposition) becomes difficult. If the weight average molecular weight (Mw) is 650 or lower, the affinity to the cellulose derivative is easily enhanced. Therefore, if the weight average molecular weight (Mw) is in the range described above, moldability of the resin composition is enhanced.

In addition, the weight average molecular weight (Mw) of the polyether ester compound is a value measured by gel permeation chromatography (GPC). Specifically, the measurement of the molecular weight by GPC is performed by using HPLC1100 manufactured by Tosoh corporation as a measurement apparatus, and TSKgel GMHHR-M+TSKgel GMHHR-M (7.8 mm I.D. 30 cm) which is a column manufactured by Tosoh Corporation, with a chloroform solvent. Also, the weight average molecular weight is calculated by using a molecular weight calibration curve obtained by a monodispersed polystyrene standard sample from the measurement result.

The viscosity of the polyether ester compound at 25° C. is preferably in the range of 35 mPa·s to 50 mPa·s, and more preferably in the range of 40 mPa·s to 45 mPa·s.

If the viscosity is 35 mPa·s or greater, the dispersibility to the cellulose derivative is easily enhanced. If the viscosity is 50 mPa·s or lower, anisotropy of the dispersion of the polyether ester compound hardly appears. Therefore, if the viscosity is in the range described above, the moldability of the resin composition is enhanced.

In addition, the viscosity is a value measured by an E-type viscosmeter.

A solubility parameter (SP value) of the polyether ester compound is preferably in the range of 9.5 to 9.9, and more preferably in the range of 9.6 to 9.8.

If the solubility parameter (SP value) is in the range of 9.5 to 9.9, dispersibility to the cellulose derivative is easily enhanced.

The solubility parameter (SP value) is a value calculated by a Fedor method, and specifically, the solubility parameter (SP value) is, for example, calculated by the following equation in conformity with the description in Polym. Eng. Sci., vol. 14, p. 147 (1974).

$$\text{SP value} = \sqrt{(Ev/v)} = \sqrt{(\Sigma \Delta ei / \Sigma \Delta vi)} \qquad \text{Equation:}$$

(In the equation, Ev: evaporation energy (cal/mol), v: molar volume (cm$^3$/mol), $\Delta ei$: evaporation energy of each atom or atom group, and $\Delta vi$: molar volume of each atom or atom group)

In addition, the solubility parameter (SP value) employs (cal/cm$^3$)$^{1/2}$ as a unit, but the unit is omitted in conformity with practice, and is described in a dimensionless manner.

Hereinafter, specific examples of the polyether ester compound are described, but the invention is not limited thereto.

| | R⁴ | R⁵ | A¹ | A² | Mw | Viscosity (25° C.) | APHA | SP value |
|---|---|---|---|---|---|---|---|---|
| PEE1 | —(CH$_2$)$_6$— | —(CH$_2$)$_4$— | Phenyl group | Phenyl group | 550 | 43 | 120 | 9.7 |
| PEE2 | —(CH$_2$)$_2$— | —(CH$_2$)$_4$— | Phenyl group | Phenyl group | 570 | 44 | 115 | 9.4 |
| PEE3 | —(CH$_2$)$_{10}$— | —(CH$_2$)$_4$— | Phenyl group | Phenyl group | 520 | 48 | 110 | 10.0 |
| PEE4 | —(CH$_2$)$_6$— | —(CH$_2$)$_2$— | Phenyl group | Phenyl group | 550 | 43 | 115 | 9.3 |
| PEE5 | —(CH$_2$)$_6$— | —(CH$_2$)$_{10}$— | Phenyl group | Phenyl group | 540 | 45 | 115 | 10.1 |
| PEE6 | —(CH$_2$)$_6$— | —(CH$_2$)$_4$— | t-Butyl group | t-Butyl group | 520 | 44 | 130 | 9.7 |
| PEE7 | —(CH$_2$)$_6$— | —(CH$_2$)$_4$— | Phenyl group | Phenyl group | 460 | 45 | 125 | 9.7 |
| PEE8 | —(CH$_2$)$_6$— | —(CH$_2$)$_4$— | Phenyl group | Phenyl group | 630 | 40 | 120 | 9.7 |
| PEE9 | —(CH$_2$)$_6$— | —(CH$_2$)$_4$— | Phenyl group | Phenyl group | 420 | 43 | 135 | 9.7 |
| PEE10 | —(CH$_2$)$_6$— | —(CH$_2$)$_4$— | Phenyl group | Phenyl group | 670 | 48 | 105 | 9.7 |
| PEE11 | —(CH$_2$)$_6$— | —(CH$_2$)$_4$— | Phenyl group | Phenyl group | 550 | 35 | 130 | 9.7 |
| PEE12 | —(CH$_2$)$_6$— | —(CH$_2$)$_4$— | Phenyl group | Phenyl group | 550 | 49 | 125 | 9.7 |
| PEE13 | —(CH$_2$)$_6$— | —(CH$_2$)$_4$— | Phenyl group | Phenyl group | 550 | 32 | 120 | 9.7 |
| PEE14 | —(CH$_2$)$_6$— | —(CH$_2$)$_4$— | Phenyl group | Phenyl group | 550 | 53 | 105 | 9.7 |
| PEE15 | —(CH$_2$)$_6$— | —(CH$_2$)$_4$— | Phenyl group | Phenyl group | 550 | 43 | 135 | 9.7 |
| PEE16 | —(CH$_2$)$_6$— | —(CH$_2$)$_4$— | Phenyl group | Phenyl group | 550 | 43 | 105 | 9.7 |
| PEE17 | —(CH$_2$)$_6$— | —(CH$_2$)$_4$— | Phenyl group | Phenyl group | 550 | 43 | 150 | 9.7 |
| PEE18 | —(CH$_2$)$_6$— | —(CH$_2$)$_4$— | Phenyl group | Phenyl group | 550 | 43 | 95 | 9.7 |

Other Components

The resin composition according to the exemplary embodiment may contain other components in addition to the components described above, if necessary. As the other components, for example, a flame retardant, a compatibilizer, an antioxidant, a release agent, a light resistant agent, a weather resistant agent, a colorant, pigments, a modifier, a drip preventing agent, an antistatic agent, a hydrolysis inhibitor, a filler, and a reinforcing agent (glass fiber, carbon fiber, talc, clay, mica, glass flake, milled glass, glass bead, crystalline silica, alumina, silicon nitride, aluminum nitride, boron nitride, and the like) are exemplified. The content of the respective components is in the range of 0% by weight to 5% by weight with respect to the total amount of the resin composition. Here, the expression "0% by weight" means not including other components.

The resin composition according to the exemplary embodiment may contain other resins in addition to the resin described above. However, the other resins are included in amounts with which the ratio of the cellulose derivative occupied in the total amount of the resin composition becomes in the range described above.

As the other resins, for example, the thermoplastic resins which are well-known in the art are included. Specifically, polycarbonate resin; polypropylene resin; polyester resin; a polyolefin resin; polyester carbonate resin; a polyphenylene ether resin; polyphenylene sulfide resin; a polysulfone resin; polyether sulfone resin; a polyarylene resin; a polyetherimide resin; a polyacetal resin; a polyvinyl acetal resin; a polyketone resin; a polyetherketone resin; a polyetheretherketone resin; a polyarylketone resin; a polyether nitrile resin; a liquid crystal resin; a polybenzimidazole resin; polyparabanic acid resin; a vinyl polymer or a vinyl copolymer resin obtained by polymerizing or copolymerizing one or more vinyl monomers selected from the group consisting of an aromatic alkenyl compound, a methacrylic acid ester, acrylic acid ester, and a vinyl cyanide compound; a diene-aromatic alkenyl compound copolymer resin; a vinyl cyanide-diene-aromatic alkenyl compound copolymer resin; an aromatic alkenyl compound-diene-vinyl cyanide-N-phenylmaleimide copolymer resin; a vinyl cyanide-(ethylene-diene-propylene (EPDM))-aromatic alkenyl compound copolymer resin; a vinyl chloride resin; and a chlorinated vinyl chloride resin are exemplified. These resins may be used singly, or two or more types thereof may be used in combination.

Method of Preparing Resin Composition

The resin composition according to the exemplary embodiment is prepared, for example, by melting and kneading the mixture of the cellulose derivative and the components described above. In addition, the resin composition according to the exemplary embodiment is prepared by dissolving the components in a solvent. As a melting and kneading unit, well known units are included, and specifically, for example, a twin screw extruder, a Henschel mixer, a Banbury mixer, a single screw extruder, a multi-screw extruder, and a co-kneader are included.

In addition, the temperature at the time of kneading may be determined according to the melting temperature of the cellulose derivative used, but in view of the thermal decomposition and the fluidity, the temperature in the range of 140° C. to 240° C. is preferable, and the temperature in the range of 160° C. to 200° C. is more preferable.

Resin Molded Article

The resin molded article according to the exemplary embodiment includes the resin composition according to the exemplary embodiment. That is, the resin molded article according to the exemplary embodiment is made of the same composition as the resin composition according to the exemplary embodiment.

Specifically, the resin molded article according to the exemplary embodiment may be obtained by molding the resin composition according to the exemplary embodiment. As the molding method, injection molding, extrusion molding, blow molding, heat press molding, calendaring molding, coating molding, cast molding, dipping molding, vacuum molding, transfer molding and the like may be applied.

As the method of molding the resin molded article according to the exemplary embodiment, since degrees of freedom in shape are high, injection molding is preferable. With respect to injection molding, the resin composition is heated and melted, casted into a mold, and solidified, so as to obtain a molded article. The resin composition may be molded by injection compression molding.

The cylinder temperature of the injection molding is, for example, in the range of 140° C. to 240° C., preferably in the range of 150° C. to 220° C., and more preferably in the range of 160° C. to 220° C. The mold temperature of the injection molding is, for example, in the range of 30° C. to 120° C., and more preferably in the range of 40° C. to 80° C. The injection molding may be performed, for example, by using a commercially available apparatus such as NEX500 manufactured by Nissei Plastic Industrial Co., Ltd., NEX150 manufactured by Nissei Plastic Industrial Co., Ltd., NEX70000 manufactured by Nissei Plastic Industrial Co., Ltd., and SE50D manufactured by Toshiba Machine Co., Ltd.

The resin molded article according to the exemplary embodiment may be appropriately used for the purposes of electric and electronic apparatuses, business machines, home appliances, automobile interior materials, engine covers, car bodies, containers, and the like. More specifically, the resin molded article may be used in housings of electric and electronic apparatuses or home appliances; various components of electric and electronic apparatuses or home appliances; interior components of automobiles; storage cases of CD-ROM, DVD, and the like; food containers; drink bottles; food trays; wrapping materials; films; and sheets.

EXAMPLES

Hereinafter, the invention is described in greater detail with reference to examples, but the invention is not limited to the examples. In addition, unless described otherwise, the expression "part" refers to "part by weight".

Preparation of Cellulose 2 kg of cellulose (KC Flock W50 manufactured by Nippon Paper Industries Co., Ltd.) is put to 20 L of an aqueous solution of 0.1 M hydrochloric acid, and stirred at room temperature (25° C.). In stirring time shown in Table 1, cellulose in respective molecular weights is obtained. In addition, EP-1800 (product name, manufactured by Shinto Scientific Co., Ltd.) is used as a stirring apparatus, and the rotation speed at the time of stirring is set to 500 rpm.

The weight average molecular weight is measured with a GPC apparatus (manufactured by Tosoh corporation, HLC-8320GPC, Column: TSKgel α-M), by using a solution of dimethylacetamide/lithium chloride having a volume ratio of 90/10.

TABLE 1

| | Stirring time (hr) | Weight average molecular weight |
|---|---|---|
| Compound 1 | 0.3 | 75,500 |
| Compound 2 | 1 | 57,800 |
| Compound 3 | 2 | 31,000 |
| Compound 4 | 3 | 10,300 |
| Compound 5 | 5 | 9,400 |

Preparation of Cellulose Derivative

Acetylation Step

Pretreatment activation is performed by spraying 1 kg of Compound 1 in Table 1, with 500 g of glacial acetic acid. Thereafter, a mixture of 3.8 kg of glacial acetic acid, 2.4 kg of acetic anhydride, and 80 g of sulfuric acid is added, and esterification of Compound 1 is performed while the mixture is stirred and mixed at a temperature of 40° C. or lower. Esterification is finished when fiber fragments disappear.

Deacetylation Step 2 kg of acetic acid and 1 kg of water are added to the mixture, and stirred for 2 hours at room temperature (25° C.)

Refinement Step

Further, this solution is slowly dripped to a solution obtained by dissolving 20 kg of sodium hydroxide in 40 kg of water while the solution is stirred. The obtained white precipitate is suction-filtered and washed with 60 kg of water, and a cellulose derivative (Compound 6) is obtained.

Acetyl cellulose derivatives (Compounds 7 to 10) are obtained in the same manner as described above except for changing Compound 1 to Compounds 2 to 5.

An acetyl cellulose derivative (Compound 11) is obtained in the same manner as described above except for using Compound 3 and changing stirring time in the deacetylation step to 0.5 hours.

An acetyl cellulose derivative (Compound 12) is obtained in the same manner as described above except for using Compound 3 and changing stirring time in the deacetylation step to 3 hours.

Weight average molecular weights of the obtained acetyl cellulose derivatives (Compounds 6 to 12) are obtained in the same method as in Compound 1, and substitution degrees are obtained by a $H^1$-NMR measurement (JNM-ECZR manufactured by JEOL, Ltd.).

The results are collectively shown in Table 2.

TABLE 2

| | Weight average molecular weight | Substituent | Substitution degree |
|---|---|---|---|
| Compound 6 | 79,800 | Acetyl | 2.15 |
| Compound 7 | 63,300 | Acetyl | 2.22 |
| Compound 8 | 38,800 | Acetyl | 2.25 |
| Compound 9 | 11,000 | Acetyl | 2.21 |
| Compound 10 | 9,900 | Acetyl | 2.19 |
| Compound 11 | 40,500 | Acetyl | 2.59 |
| Compound 12 | 37,000 | Acetyl | 1.65 |

Acetyl cellulose derivatives C-1 to C-6 that may be obtained in Synthesis Examples 1 to 6 (paragraphs [0107] to [0112]) of Japanese Patent No. 5470032 are set to Compounds 20 to 25 as in Table 3 described below.

TABLE 3

| | Synthesis example of Japanese Patent No. 5470032 | Weight average molecular weight | Substituent | Substitution degree* |
|---|---|---|---|---|
| Compound 20 | C-1 | 185,000 | Methyl/propylene oxy acetyl + acetyl | 1.95/1.05 |
| Compound 21 | C-2 | 617,000 | Methyl/propylene oxy acetyl + acetyl | 1.84/1.16 |
| Compound 22 | C-3 | 770,000 | Methyl/propylene oxy acetyl + acetyl | 1.47/1.53 |
| Compound 23 | C-4 | 680,000 | Methyl/propylene oxy acetyl + acetyl | 1.45/1.55 |
| Compound 24 | C-5 | 402,000 | Methyl/propylene oxy propionyl + propionyl | 1.5/1.5 |
| Compound 25 | C-6 | 237,000 | Methyl/propylene oxy acetyl + acetyl | 1.43/1.57 |

*Substitution degree of alkyl/Sum of substitution degree of alkyleneoxyacyl and substitution degree of acyl Preparation of Pellets Kneading is performed with a twin screw kneading apparatus (TEX41SS manufactured by Toshiba Machine Co., Ltd.) at preparation composition ratios and kneading temperatures shown in Examples 1 to 10 and Comparative Examples 1 to 8 shown in Table 4, so as to obtain resin composition pellets.

The melt flow rates (MFR) of the obtained pellets are measured in the conditions of a resin temperature of 220° C., and a load of 10 kg by using a melt flow indexer (MI manufactured by Toyo Seiki Seisaku-sho, Ltd.). The results are shown in Table 4.

TABLE 4

| | Composition ratio | | | | | | | |
|---|---|---|---|---|---|---|---|---|
| | Cellulose derivatives | | | | Plasticizer | | Kneading | |
| | Kind | Amount (parts) | Kind | Amount (parts) | Kind | Amount (parts) | temperature (° C.) | MFR (g/10 min) |
| Example 1 | Compound 7 | 100 | | | | | 200 | 12 |
| Example 2 | Compound 8 | 100 | | | | | 190 | 12 |
| Example 3 | Compound 9 | 100 | | | | | 180 | 13 |
| Example 4 | Compound 8 | 95 | | | Compound 27 | 5 | 180 | 18 |
| Example 5 | Compound 8 | 90 | | | Compound 27 | 10 | 160 | 19 |
| Example 6 | Compound 8 | 90 | Compound 26 | 10 | | | 190 | 11 |
| Example 7 | Compound 6 | 100 | | | | | 200 | 11 |
| Example 8 | Compound 10 | 100 | | | | | 200 | 14 |
| Example 9 | Compound 11 | 100 | | | | | 200 | 11 |
| Example 10 | Compound 12 | 100 | | | | | 200 | 11 |
| Comparative Example 1 | Compound 8 | 85 | | | Compound 27 | 15 | 180 | 22 |
| Comparative Example 2 | | | Compound 20 | 100 | | | 200 | 45 |
| Comparative Example 3 | | | Compound 21 | 100 | | | 205 | 42 |
| Comparative Example 4 | | | Compound 22 | 100 | | | 200 | 40 |
| Comparative Example 5 | | | Compound 23 | 100 | | | 200 | 42 |
| Comparative Example 6 | | | Compound 24 | 100 | | | 190 | 48 |
| Comparative Example 7 | | | Compound 25 | 100 | | | 190 | 49 |
| Comparative Example 8 | | | Compound 26 | 100 | | | 200 | 8 |

In addition, details of Compounds 26 and 27 shown in Table 4 are shown below.

Compound 26: Dimethyl cellulose (L50 manufactured by Daicel Corporation, weight average molecular weight: 170,000)

Compound 27: Adipic acid ester-containing compound (Daifatty 101 manufactured by Daihachi Chemical Industry Co., Ltd.)

Injection Molding

With the obtained pellets, D2 test samples (length×width=60 mm×60 mm, and thickness of 2 mm) are prepared by using an injection molding machine (PNX40 manufactured by Nissei Plastic Industrial Co., Ltd.) at cylinder temperatures and mold temperatures shown in Table 5. At this point, the D2 test samples are solidified until the D2 test samples may be released from molds, are injected in a condition in which D2 test samples may be continuously molded, and an interval between shots (injection intervals) are set to be a cycle time. The results are shown in Table 5.

Existence of Sink Mark

Whether sink marks in the molded D2 test samples exist is visually observed. The results are shown in Table 5.

Water Absorption Warp

With respect to the molded D2 test samples, water absorption warps are evaluated as follows.

A thermohygrostat bath (ARL-1100-J manufactured by ESPEC CORP.) is set to 65° C./85% RH, the D2 test samples are put on an aluminum plate in the thermohygrostat bath and kept for 24 hours, and maximum distortion amounts are measured with a vernier caliper, so as to be evaluated as the water absorption warps.

TABLE 5

| | Molding condition | | Cycle time | | Water absorption |
|---|---|---|---|---|---|
| | Cylinder temperature (° C.) | Mold temperature (° C.) | of injection molding (sec) | Existence of sink mark | warp (Maximum distortion amount) (mm) |
| Example 1 | 200 | 40 | 35 | No sink mark | 0.15 |
| Example 2 | 190 | 40 | 38 | No sink mark | 0.17 |
| Example 3 | 180 | 40 | 32 | No sink mark | 0.18 |
| Example 4 | 180 | 40 | 40 | No sink mark | 0.17 |
| Example 5 | 160 | 40 | 39 | No sink mark | 0.18 |
| Example 6 | 190 | 40 | 38 | No sink mark | 0.18 |
| Example 7 | 200 | 40 | 50 | No sink mark | 0.27 |
| Example 8 | 200 | 40 | 48 | No sink mark | 0.28 |
| Example 9 | 200 | 40 | 45 | No sink mark | 0.25 |
| Example 10 | 200 | 40 | 47 | No sink mark | 0.24 |
| Comparative Example 1 | 180 | 40 | 65 | Sink mark | 0.74 |
| Comparative Example 2 | 200 | 40 | 92 | Sink mark | 0.55 |

TABLE 5-continued

| | Molding condition | | Cycle time | | Water absorption |
|---|---|---|---|---|---|
| | Cylinder temperature (° C.) | Mold temperature (° C.) | of injection molding (sec) | Existence of sink mark | warp (Maximum distortion amount) (mm) |
| Comparative Example 3 | 205 | 40 | 94 | Sink mark | 0.58 |
| Comparative Example 4 | 200 | 40 | 91 | Sink mark | 0.68 |
| Comparative Example 5 | 200 | 40 | 93 | Sink mark | 0.87 |
| Comparative Example 6 | 190 | 40 | 105 | Sink mark | 0.84 |
| Comparative Example 7 | 190 | 40 | 102 | Sink mark | 0.82 |
| Comparative Example 8 | 250 | 60 | 100 | Sink mark | 1.58 |

From the results above, it is found that the formation of the water absorption warps of the D2 test samples is prevented in the examples, compared with the comparative examples.

In the examples, cycle time of injection molding (that is molding cycle) is short and the formation of a sink mark is prevented, compared with the comparative examples.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A resin composition comprising:
   90% by weight or more of a cellulose derivative with respect to a total amount of the resin composition, the cellulose derivative having at least one hydroxyl group substituted with an acetyl group and having a weight average molecular weight of from 9,900 to 79,800,
   wherein a melt flow rate (MFR) of the resin composition is in a range of 10 g/10 min to 20 g/10 min.

2. The resin composition according to claim 1, wherein the melt flow rate (MFR) of the resin composition is in a range of 12 g/10 min to 18 g/10 min.

3. The resin composition according to claim 1, wherein the melt flow rate (MFR) of the resin composition is in a range of 14 g/10 min to 16 g/10 min.

4. The resin composition according to claim 1, comprising 95% by weight or more of the cellulose derivative with respect to the total amount of the resin composition.

5. The resin composition according to claim 1, wherein the weight average molecular weight of the cellulose derivative is 10,000 or greater and less than 75,000.

6. The resin composition according to claim 1, wherein a substitution degree of the acetyl group in the cellulose derivative is in a range of 1.8 to 2.5.

7. The resin composition according to claim 2, wherein a substitution degree of the acetyl group in the cellulose derivative is in a range of 1.8 to 2.5.

8. The resin composition according to claim 3, wherein a substitution degree of the acetyl group in the cellulose derivative is in a range of 1.8 to 2.5.

9. The resin composition according to claim 4, wherein a substitution degree of the acetyl group in the cellulose derivative is in a range of 1.8 to 2.5.

10. The resin composition according to claim 5, wherein a substitution degree of the acetyl group in the cellulose derivative is in a range of 1.8 to 2.5.

11. The resin composition according to claim 1, wherein a substitution degree of the acetyl group in the cellulose derivative is in a range of 2.0 to 2.5.

12. The resin composition according to claim 1, wherein a substitution degree of the acetyl group in the cellulose derivative is in a range of 2.2 to 2.5.

13. A resin molded article comprising the resin composition according to claim 1.

14. The resin molded article according to claim 13, which is molded by injection molding.

15. The resin composition according to claim 1, wherein the weight average molecular weight of the cellulose derivative is 20,000 or greater and less than 75,000.

* * * * *